United States Patent [19]
Cai et al.

[11] Patent Number: 5,909,566
[45] Date of Patent: Jun. 1, 1999

[54] MICROPROCESSOR CIRCUITS, SYSTEMS, AND METHODS FOR SPECULATIVELY EXECUTING AN INSTRUCTION USING ITS MOST RECENTLY USED DATA WHILE CONCURRENTLY PREFETCHING DATA FOR THE INSTRUCTION

[75] Inventors: George Z. N. Cai; Jonathan H. Shiell, both of Plano, Tex.

[73] Assignee: Texas Instruments Incorporated, Dallas, Tex.

[21] Appl. No.: 09/001,112

[22] Filed: Dec. 30, 1997

Related U.S. Application Data

[60] Provisional application No. 60/034,129, Dec. 31, 1996.
[51] Int. Cl.$^6$ ...................................................... G06F 9/38
[52] U.S. Cl. ............................................ 395/383; 395/585
[58] Field of Search ..................................... 395/585, 383, 395/580; 711/118, 207; 364/243.41, 960.7, 965, 965.4

[56] References Cited

U.S. PATENT DOCUMENTS

| | | | |
|---|---|---|---|
| 4,775,927 | 10/1988 | Hester et al. | 395/383 |
| 5,146,570 | 9/1992 | Hester et al. | 395/585 |
| 5,233,702 | 8/1993 | Emma et al. | 711/118 |
| 5,278,962 | 1/1994 | Masuda et al. | 711/207 |
| 5,377,336 | 12/1994 | Eickemeyer et al. | 395/383 |
| 5,426,768 | 6/1995 | Kanazawa | 395/500 |

*Primary Examiner*—Zarni Maung
*Assistant Examiner*—Khanh Quang Dinh
*Attorney, Agent, or Firm*—Robert D. Marshall, Jr.; Gerald E. Laws; Richard L. Donaldson

[57] ABSTRACT

A method of operating a microprocessor (12) having an on-chip storage resource (100a). The method first receives a data fetching instruction into an instruction pipeline (38) at a first time. The instruction pipeline has a preliminary stage (40), a plurality of stages (42 through 46) following the preliminary stage, and an execution stage (48) following the plurality of stages. The step of receiving a data fetching instruction at the first time comprises receiving the data fetching instruction in the preliminary stage. The method second performs various steps, including fetching a first data quantity (MRU TARGET DATA) for the data fetching instruction to complete the execution stage of the pipeline, completing the execution stage in connection with the data fetching instruction using the first data quantity, and storing the first data quantity in the on-chip storage resource. The method third receives the data fetching instruction into the preliminary stage at a second time (108). In response, the method fourth issues a prefetch request (110) for a prefetched data quantity for the data fetching instruction to complete the execution stage of the pipeline. The method fifth completes the execution stage (122 or 132) in connection with the data fetching instruction using a predetermined data quantity. The predetermined data quantity is selected from a group of quantities (TARGET DATA) comprising the first data quantity in the on-chip resource and the prefetched data quantity.

18 Claims, 4 Drawing Sheets

MICROPROCESSOR CIRCUITS, SYSTEMS, AND METHODS FOR SPECULATIVELY EXECUTING AN INSTRUCTION USING ITS MOST RECENTLY USED DATA WHILE CONCURRENTLY PREFETCHING DATA FOR THE INSTRUCTION

CROSS-REFERENCES TO RELATED APPLICATIONS

This application claims priority under 35 USC 199(e) (1) of provisional application Ser. No. 60/034,129, filed Dec. 31, 1996.

STATEMENT REGARDING FEDERALLY SPONSORED RESEARCH OR DEVELOPMENT

Not Applicable.

BACKGROUND OF THE INVENTION

The present embodiments relate to microprocessor systems, and are more particularly directed to microprocessor circuits, systems, and methods for speculatively executing an instruction using its most recently used data while concurrently prefetching data for the instruction.

Microprocessor technology continues to advance at a rapid pace, with consideration given to all aspects of design. Designers constantly strive to increase performance, while maximizing efficiency. With respect to performance, greater overall microprocessor speed is achieved by improving the speed of various related and unrelated microprocessor circuits and operations. For example, one area in which operational efficiency is improved is by providing parallel and out-of-order instruction execution. As another example, operational efficiency also is improved by providing faster and greater access to information, with such information including instructions and/or data. The present embodiments are primarily directed at this access capability and, more particularly, to improving access to data by way of prefetching such data in response to either data load or data store operations.

One very common approach in modem computer systems directed at improving access time to information is to include one or more levels of cache memory within the system. For example, a cache memory may be formed directly on a microprocessor, and/or a microprocessor may have access to an external cache memory. Typically, the lowest level cache (i.e., the first to be accessed) is smaller and faster than the cache or caches above it in the hierarchy, and the number of caches in a given memory hierarchy may vary. In any event, when utilizing the cache hierarchy, when an information address is issued, the address is typically directed to the lowest level cache to see if that cache stores information corresponding to that address, that is, whether there is a "hit" in that cache. If a hit occurs, then the addressed information is retrieved from the cache without having to access a memory higher in the memory hierarchy, where that higher ordered memory is likely slower to access than the hit cache memory. On the other hand, if a cache hit does not occur, then it is said that a cache miss occurs. In response, the next higher ordered memory structure is then presented with the address at issue. If this next higher ordered memory structure is another cache, then once again a hit or miss may occur. If misses occur at each cache, then eventually the process reaches the highest ordered memory structure in the system, at which point the addressed information may be retrieved from that memory.

Given the existence of cache systems, another prior art technique for increasing speed involves the prefetching of information in combination with cache systems. Prefetching involves a speculative retrieval, or preparation to retrieve, information, where the information is retrieved from a higher level memory system, such as an external memory, into a cache under the expectation that the retrieved information may be needed by the microprocessor for an anticipated event at some point after the next successive clock cycle. In this regard, the instance of a load is perhaps more often thought of in connection with retrieval, but note that prefetching may also concern a data store as well. More specifically, a load occurs where a specific data is retrieved so that the retrieved data may be used by the microprocessor. However, a store operation often first retrieves a group of data, where a part of that group will be overwritten. Still further, some store operations, such as a store interrogate, do not actually retrieve data, but prepare some resource external from the microprocessor for an upcoming event which will store information to that resource. Each of these cases, for purposes of this Background and the present embodiments to follow, should be considered a type of prefetch. In any event, in the case of prefetching where data is speculatively retrieved into an on-chip cache, if the anticipated event giving rise to the prefetch actually occurs, the prefetched information is already available in the cache and, therefore, may be fetched from the cache without having to seek it from a higher ordered memory system. In other words, prefetching lowers the risk of a cache miss once an actual fetch is necessary.

Given the above techniques, the present inventors provide within a microprocessor a load target buffer ("LTB") which predicts the address of the data to be used as the address for a prefetch. Moreover, the present embodiments recognize and thereafter provide for a particular type of data pattern, where that pattern repeatedly uses, for the same data fetching instruction, the same data as used by one or more past incidents of that instruction. Thus, below are presented various embodiments which address these as well as other considerations ascertainable by a person skilled in the art.

BRIEF SUMMARY OF THE INVENTION

In one embodiment, there is a method of operating a microprocessor having an on-chip storage resource. The method first receives a data fetching instruction into an instruction pipeline at a first time. The instruction pipeline has a preliminary stage, a plurality of stages following the preliminary stage, and an execution stage following the plurality of stages. The step of receiving a data fetching instruction at the first time comprises receiving the data fetching instruction in the preliminary stage. The method second performs various steps, including fetching a first data quantity for the data fetching instruction to complete the execution stage of the pipeline, completing the execution stage in connection with the data fetching instruction using the first data quantity, and storing the first data quantity in the on-chip storage resource. The method third receives the data fetching instruction into the preliminary stage at a second time. In response, the method fourth issues a prefetch request for a prefetched data quantity for the data fetching instruction to complete the execution stage of the pipeline. The method fifth completes the execution stage in connection with the data fetching instruction using a predetermined data quantity. The predetermined data quantity is selected from a group of quantities comprising the first data quantity in the on-chip resource and the prefetched data quantity. Other circuits, systems, and methods are also disclosed and claimed.

DETAILED DESCRIPTION OF THE INVENTION

Figure 1:
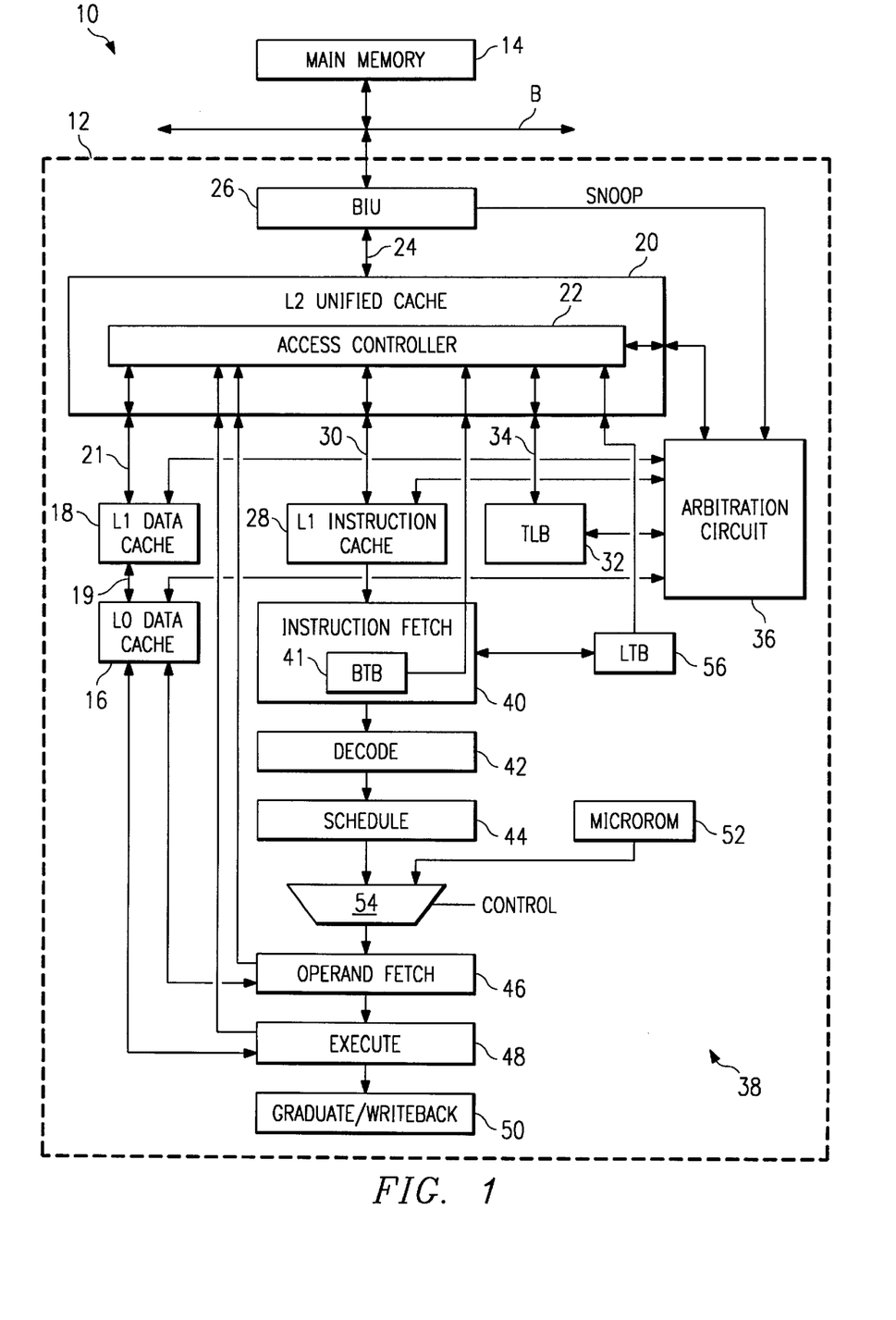
FIG. 1 illustrates an electrical diagram of a microprocessor having a multiple level memory system with various components for both fetching and prefetching information from that system.

FIG. 1 illustrates a block diagram of a microprocessor based system designated generally at 10 and in accordance with the present embodiments. System 10 includes a microprocessor 12 which has a bus B, and which may connect to various external devices. However, for purposes of providing a context for the present embodiments, only an external memory 14 is shown connected to bus B, with additional items known in the art. Note also that microprocessor 12 may represent various different types of microprocessor structures, and numerous such structures are either known to, or ascertainable by, one skilled in the art. At this point, however, the details related to such a microprocessor other than in connection with the components of FIG. 1 are neither shown nor explained in order to simplify the present discussion.

Turning to the blocks shown in FIG. 1, microprocessor 12 includes a memory hierarchy in a manner known in the art, that is, a hierarchy which reads and writes data starting from a lowest ordered storage system toward higher ordered storage systems. At the lowest level of such a system is a zero level data cache circuit, shown in FIG. 1 as L0 data cache 16. The "L0" indication demonstrates the matter of memory hierarchy as is known in the art. Specifically, cache circuits with a lower numerical designation are commonly closer to the execution unit of the microprocessor pipeline (described below) as compared to cache circuits with a higher numerical designation, such as the L1 and L2 data cache circuits discussed later. Moreover, the numerical designation of the cache provides an ascending indication of the order in which the caches are typically accessed when either reading from, or writing to, the caches. Thus, such an access first occurs to an L0 cache and, if a cache miss occurs to that cache, it is followed by an access to an L1 cache, and so forth through the memory hierarchy until a hit is found in either a cache or other memory structure. Returning to L0 data cache 16, in the present embodiment it is preferably a 4-way set associative cache operable to store a total of 1 Kbytes of data in 16 byte blocks, and with each way operable to output 64 bits (i.e., 8 bytes) at a time.

Microprocessor 12 further includes an L1 data cache 18, and which is connected to L0 data cache 16 via a bus 19. Again, the "L1" designation necessarily indicates that this cache is higher in the memory hierarchy as compared to L0 data cache 16. In the preferred embodiment, L1 data cache 18 is preferably a 2-way set associative cache operable to store a total of 8 Kbytes of data in 32 byte blocks, and with each way operable to output 128 bits (i.e., 16 bytes) at a time.

System 10 further includes an L2 unified cache 20, and which is connected to L1 data cache 18 via a bus 21. In the preferred embodiment, L2 unified cache 20 is preferably a 4-way set associative cache operable to store a total of 64 Kbytes of data in 64 byte blocks with 32 byte sub-blocks, and with each way operable to output 256 bits (i.e., 32 bytes) at a time. Note that the L2 cache is referred to as a unified cache, meaning in addition to storing data it stores other information as well. Specifically, as shown below, L2 unified cache 20 further stores instructions as well as address translation information. Note that in an alternative embodiment, however, the type or types of information stored may vary. In any event, with respect to data note then the memory hierarchy formed, that is, from L0 data cache 16, to L1 data cache 18, to L2 unified cache 20. Therefore, a first source giving rise to a potential addressing of L2 unified cache 20 is L1 data cache 18 in response to a miss in L1 data cache 18, which in turn arose from a miss in L0 data cache 16. Moreover, in each fetch instance causing a cache miss, data is sought at the next higher level of this hierarchy; thus, if a miss occurs at L2 unified cache 20, then the data is addressed from external memory 14. Note also that L2 unified cache 20 further includes an access controller 22. Access controller 22 receives requests to access L2 unified cache 20, where those requests may be either for fetching or prefetching information from L2 unified cache 20.

Before discussing the other information paths shown in FIG. 1 relating to L2 unified cache 20, and completing the illustration of FIG. 1 in an upward sense toward bus B, note that L2 unified cache 20 is further connected by way of a bus 24 to a bus interface unit ("BIU") 26, and BIU 26 is connected to bus B. As suggested above, bus B permits external access from microprocessor 12 and, therefore, may control and perform communication between microprocessor 12 and other elements external from the microprocessor, including external memory 14 which one skilled in the art will appreciate is higher in the memory hierarchy than L2 unified cache 20 (and, of course, also higher than L1 data cache 18 and L0 data cache 16 as well). As another example, note that an external cache may be connected between bus B and main memory 14 and, thus, microprocessor 12 could communicate with such an external cache. As still another example, note that microprocessor 12 may communicate with other microprocessors in a multiple microprocessor system, such as communicating with the on-chip memory or memories of those other microprocessors. In any event, these external devices are by way of example and, at this point, any additional elements external from microprocessor 12 are not detailed for sake of simplicity, with examples of such elements known or ascertainable by one skilled in the art.

As mentioned above, L2 unified cache 20 also stores instructions. In this regard, a second source giving rise to a potential addressing of L2 unified cache 20 is L1 instruction cache 28. Specifically, L1 instruction cache 28 is connected via a bus 30 to L2 unified cache 20. As its name implies, L1 instruction cache 28 stores instructions (as opposed to data as is stored in L1 data cache 18). In the preferred embodiment, L1 instruction cache 28 is constructed and sized in the same manner as L1 data cache 18 and, therefore, is preferably a 2-way set associative cache operable to store a total of 8 Kbytes of information; here, the information is instructions in 32 byte blocks, and each way is operable to output 128 instruction bits (i.e., 16 bytes) at a time.

A third source giving rise to a potential addressing of L2 unified cache 20 is a translation lookaside buffer ("TLB") 32. Specifically, TLB 32 is connected via a bus 34 to L2 unified cache 20. In the preferred embodiment, as is common in the microprocessor art, logical instruction addresses are translated to corresponding physical addresses. In this context, TLB 32 stores a table of some of the existing translations so that such translations may be accessed at subsequent times without having to re-calculate the translation. In addition, if there is a miss in the look up to TLB 32, then hardware associated with TLB 32 begins a table walk through page tables in main memory to determine the address translation. These main memory page table also may be stored, in part or whole, in L2 unified cache 20. In the preferred embodiment, TLB 32 is preferably 256 entries, 4-way set associative, and sized such that each line stores a single translation.

Having noted the different levels of caches in FIG. 1, note further that each such cache is also connected to an arbitration circuit 36. Arbitration circuit 36 is included to demonstrate the general functionality of successive accesses to each cache based on a miss of a lower cache. For example, as mentioned above, if a cache access to L0 data cache 16 results in a cache miss, then L1 data cache 18 is accessed, followed by L2 unified cache 20, and so forth. Arbitration circuit 36, therefore, represents an arbitration control over this functionality, and may be implemented in various fashions by a person skilled in the art. Note that arbitration circuit 36 also connects to access controller 22 of L2 unified cache 20. Thus, when an access request is to be presented to L2 unified cache 20 based on a miss of a lower-level cache, then arbitration circuit 36 presents this access request to access controller 22.

A fourth source giving rise to a potential addressing of L2 unified cache 20 is any circuit providing a snoop request to L2 unified cache 20. As is known in the art, snooping is a function which ensures memory coherency through different levels in a memory hierarchy. The snoop request may be generated either internally or externally from the microprocessor. Typically, a snoop occurs by presenting an address to one or more levels of the memory system. In FIG. 1, this functionality is shown by way of a snoop address input from BIU 26 to arbitration circuit 36 which, in turn, may present the snoop address to any of the cache structures of FIG. 1. Each cache may be directed to respond in various manners to the snoop address depending on factors known in the art such as the coherency protocol being implemented. For example, the cache may be directed to merely confirm whether it stores information corresponding to the snoop address. As another example, the cache may be directed to output the information corresponding to the snoop address if it has such information. As yet another example, the cache may be directed to invalidate the information corresponding to the snoop address if it has such information. In any event, the snoop address poses yet another potential address to L2 unified cache 20.

Having presented the various components of the addressable memory hierarchy of microprocessor 12, reference is now turned to the components of the microprocessor which may require the addressable information from the memory hierarchy. In this regard, microprocessor 12 includes a pipeline designated generally at 38 and which may used to receive and process instructions in a complex instruction set computer ("CISC"). Pipeline 38 is shown by way of example as having six stages evenly numbered 40 through 50. Each of stages 40 through 50 is in some respects representative of a stage or stages known in the art, and may differ in name and/or function in different architectures. Thus, the following discussion is by way of example and without limitation to the inventive embodiments. Turning to pipeline 38, note generally that an instruction is retrieved at a beginning stage which in the present example is an instruction fetch stage 40. Instruction fetch stage 40 includes a branch target buffer ("BTB") 41 which may assist in instruction fetching in the context of branch instructions as known in the art. Instruction fetching by stage 40 occurs at a first level from L1 instruction cache 28 described above. Note also that some instruction fetches may stall the pipeline more than one clock cycle, particularly to access slower components of the memory hierarchy system. Typically, the received instruction is thereafter decoded in one or more decoding stages 42. While a pipeline may therefore include an integer number of decode stages, pipeline 38 includes only one such decode stage 42 by way of example, with it understood that typically the decode process is a multi-stage (i.e., multiple clock) process. The decode stage 42 (or stages) decompresses the more complicated instruction into one or more simple operations referred to in this document as micro-operation codes. These micro-operation codes typically may be executed in a single execution clock. Note also that micro-operation codes have different names depending on the architecture and/or manufacturer. For example, in the Texas Instruments' standard, micro-operation codes are referred to as atomic operations ("AOps"). These AOps, if completed in their entirety, represent completion and graduation of the instruction set instruction, including its opcode and operands if applicable. Note that AOps are approximately comparable to some RISC instructions and, thus, are the codes which are connected to various portions of the microprocessor to subsequently initiate execution of the decoded instruction. Thus, AOps are comparable to what is referred to in other architectures as ROps, $\mu$Ops, or RISC86 instructions.

After the micro-operation codes are generated from decode stage 42, schedule stage 44 schedules those codes to the corresponding appropriate execution units of the microprocessor. In some conventions, the scheduling stage is referred to as the issuing of each micro-operation code to its execution unit. For example, if a microprocessor includes three execution units (e.g., an arithmetic unit, a load/store unit, and a floating point unit), then a group of up to three micro-operation codes may be formed and assigned for execution in a single clock cycle by each corresponding execution unit. Indeed, a microprocessor may include more than three execution units, such as by having more than one arithmetic unit and more than one load/store unit In such an event, the number of micro-operation codes to be executed in a single clock cycle may be increased accordingly. For purposes of a referring term to use in this document, the group of micro-operation codes, regardless of its size, is referred to as a "machine word." It is not uncommon for such a machine word to require 50 or more bits per execution resource and, therefore, a microprocessor with three execution units may operate in response to a machine word on the order of 150 bits in width.

Before discussing the stage following schedule stage 44, note further that machine words may come from a different source as an alternative to that described above, namely, from a microprogram memory 52 which often is referred to in the art as a microROM. Microprogram memory 52 is commonly a read only memory which is pre-programmed with various threads of machine words. The output of microprogram memory 52 is connected as an input to a multiplexer 54 as is the output of schedule stage 44. Consequently, multiplexer 54 may, in response to various control signals which need not be detailed here, provide a machine word from microprogram memory 52 to the next successive stage rather than a machine word from schedule stage 44. More specifically, an entry point address may be generated to microprogram memory 52 in which case the first machine word in such a thread is output, and then during each successive clock cycle a successive machine word in the thread may be output. Thus, by repeating this process, one of the entire threads from microprogram memory 52 is passed to the remainder of pipeline 38, which may then execute and complete each of the machine words in the microprogram memory thread.

After multiplexer 54, operand fetch stage 46 fetches any data necessary to execute any one or more of the micro-operation codes in the currently issued machine word. Typically, this data includes operands fetched from either registers or memory. In the context of retrieving data from memory, note that stage 46 is connected to L0 data cache 16 to seek data from that cache. Again, if a miss occurs at that cache level, one skilled in the art will therefore appreciate that the data may then be sought from a higher level, such as L1 data cache 18, L2 unified cache 20, or external memory 14. Note that like instruction fetches, some data fetches also may stall the pipeline more than one clock cycle.

Execution stage 48 includes numerous execution units, such as one or more arithmetic logic units, one or more load/store units, and a floating point unit. For each such unit, the unit executes its corresponding part of the machine word, that is, each execution unit performs its corresponding function on its assigned micro-operation code. Note also that one or more execution units of execution stage 48 also may access data and, therefore, stage 48 is also connected to L0 data cache 16 and, by that connection, has access to that cache as well as to the additional data storage structures higher than that cache in the memory hierarchy of microprocessor 12.

Lastly, stage 50 graduates the instruction, meaning it is allowed to complete and take its effect, if any, on the architected state of the microprocessor. In addition, the result of the instruction, if any, may be written to some store such as a register file. This last operation is commonly referred to as writeback, and sometimes is considered a function which is not part of the final pipeline stage, but which occurs at the same time the instruction is graduated.

Given the discussion presented thus far, one skilled in the art will appreciate that microprocessor 12 includes various circuits which may access information from its memory hierarchy, where that information may be either data, instructions, or address translation tables. Note that the accesses described to this point deal with actual fetches of such information, that is, the retrieval of information where that information is fetched directly into pipeline 38. Typically, the fetched information is then acted upon in the dock cycle immediately following the cycle in which it was fetched. For example, an instruction fetched in a first clock cycle by instruction fetch stage 40 may be decoded by decode stage 42 in the next clock cycle following the first clock cycle. As another example, data fetched in a first clock cycle by data fetch stage 46 may be used by an execution unit in execution stage 48 in the next clock cycle following the first clock cycle. Lastly, note that the types of accesses described above are only by way of illustration, and still others will be ascertainable by one skilled in the art. For example, certain instructions may access the memory hierarchy to fetch information into the pipeline when the instruction is at any of various different stages of the pipeline. Moreover, the discussion of pipeline 38 above is merely by way of example, and instructions therefore may fetch information into the pipeline when passing through various pipeline stages of other types of pipeline architectures (e.g., reduced instruction set computer) as known in the art.

Having discussed accessing information by fetching, note that system 10 further includes various circuits and methodology pertaining to information accesses which involve prefetching rather than fetching. Prefetching differs from fetching in that prefetched information is retrieved speculatively rather than being retrieved because of an actual need to act upon the information as soon as it is received. In the present embodiments, prefetching is used to reduce effective access time through the memory hierarchy of system 10 as detailed below. Moreover, as introduced in the above Background, prefetching may involve instances such as a load, a data store, or a store interrogate. In any event, at this point some introductory discussion is presented to facilitate an understanding of the embodiments below. Recall that information stored in external memory 14 also may be stored in various caches, with the different caches characterized in part by their location in the memory hierarchy as well as the type of information stored by a given cache. In the instance of prefetching, when a prefetch is desired by one of various circuits within microprocessor 12 (those circuits being discussed below), the requesting circuit issues a prefetch request corresponding to the desired information. Preferably, and as detailed below, the prefetch request includes at least the address of the desired information as well as some indication of the size (e.g., number of bytes) of the desired information. In the preferred embodiment, note that the prefetch request is coupled directly to L2 unified cache 20 as opposed to a lower level cache structure. In other words, unlike a fetch request, the prefetch request does not access the lowest level(s) of cache which may store the particular type of information being sought by the request. Note that this approach arises because, in the preferred embodiment, L2 unified cache 20 is downward inclusive in its information, meaning that any information in a cache lower in order than L2 unified cache 20 is also stored in L2 unified cache 20. For example, if L1 data cache 18 stores a cache line of information, that same information is also stored in L2 unified cache 20. Consequently, if a prefetch operation is issued to L2 unified cache 20 resulting in a cache miss, then it is also known that none of the lower caches store the requested information as well and, therefore, it is beneficial to continue with the prefetch operation to bring the information on chip to L2 unified cache 20. Once the information is then brought on chip, if it is thereafter needed it is more readily accessible (i.e., at least in L2 unified cache 20) so an external access is not necessary. In this regard, note therefore that most of the benefit of prefetching is achieved by bringing the prefetched data on-chip. In other words, without the prefetch, if a fetch for that information is later issued and must retrieve the information off chip, then numerous clock cycles are likely required for this access. However, by prefetching the information on-chip, then it will be available from at least one of the on-chip caches and, therefore, the time to access that information is considerably shorter than would be required from an off chip access. Moreover, if a prefetch operation is issued to L2 unified cache 20 resulting in a cache hit, then it is known that the information is then available from L2 unified cache 20, and may even be available from a cache lower in the hierarchy as compared to L2 unified cache 20. In either location, therefore, the information is accessible in a relatively short time period as compared with having to retrieve it from an off chip resource. Additional benefits of this preferred action are described below. In any event, note that once the prefetch request is presented to L2 unified cache 20, without additional intervention it generally may be confirmed that L2 unified cache 20 either stores that information, or that information may be retrieved into L2 unified cache 20 from a higher level memory. Alternatively, the prefetched information may be stored in some other resource within microprocessor 12, such as within a group of prefetch buffers, where those buffers are either a part of L2 unified cache 20 or are a separate structure. In any event, once the information is prefetched, and if the speculative prefetch is correct, that is, if the information is thereafter needed for an actual fetch, then it is accessible from a cache (i.e., L2 unified cache 20) or other on-chip resource and, therefore, effective access time to the information is minimized.

As introduced above, various circuits may issue a prefetch request in the preferred embodiment. In this regard, note first that some of the above circuits which may issue an actual fetch also may issue a prefetch request. For example, execution stage 48 may issue a prefetch request for data, such as by operation of its one or more load/store units. As another example, while BTBs are known in the art to issue actual fetches for instructions (i.e., for placement into the pipeline for immediate decoding or the like), under the present embodiment BTB 41 of instruction fetch stage 40 also may issue a prefetch request so that one or more instructions are prefetched into L2 unified cache 20. Indeed, in this regard, the reader is referred to U.S. patent application Ser. No. 08/994,596, entitled "Combined Branch Prediction And Cache Prefetch In A Microprocessor" assigned to the same Assignee as the current patent, filed on Dec. 19, 1997, and which is hereby incorporated herein by reference. Microprocessor 12 includes additional circuits which also may issue a prefetch request. Specifically, note now that microprocessor 12 further includes a load target buffer ("LTB") 56 connected to L2 unified cache 20 (although in alternative embodiments the prefetch request it issues could be connected elsewhere, such as to a lower level cache(s)). At this point and by way of introduction, note that LTB 56 includes addresses of certain data fetching instructions and predictions based on which data will be used by those instructions in the future by microprocessor 12. Thus, once the data fetching instruction is itself fetched into pipeline 38, LTB 56 may be consulted to determine if it has an entry corresponding to the data fetching instruction. If so, and based on the prediction and possibly other information corresponding to the data fetching instruction, LTB 56 may then issue a prefetch request to L2 unified cache 20. Without other intervention, the prefetch request is responded to by a prefetch operation starting from L2 unified cache 20 and propagating upward through the memory hierarchy so that the data is confirmed to be currently on-chip (i.e., within one of its caches) or so it may be retrieved onto the microprocessor in response to the prefetch request. Thus, once retrieved, the data is available for subsequent use once the data fetching instruction requires the data as the instruction passes through pipeline 38. Note also that it is stated shortly above that the prefetch operation occurs in response to the prefetch request if there is no other intervention. In this regard, however, note that in some instances the prefetch operation in response to the request may be suppressed, or modified, based on other system parameters. For more information on such a system, the reader is referred to U.S. patent application Ser. No. 08/999,091, pending, entitled "Circuits, Systems, And Methods For Prefetch Handling In A Microprocessor-Based System", assigned to the same Assignee as the current patent, filed Dec. 29, 1997 and which is hereby incorporated herein by reference.

Looking now more closely to LTB 56, note that it predicts the address of the data to be fetched by a data fetching instruction, and for purposes of discussion this data will be referred to as target data and its address will be referred to as a target data address. In response to the prediction of LTB 56, the target data at the target data address may be prefetched into a cache (e.g., L2 unified cache 20) or other memory structure on the microprocessor chip before the data fetching instruction is executed. Hence, once the data fetching instruction thereafter requires the data, the data may be fetched from the on-chip cache or memory structure rather than having to fetch the data from some external storage device. In other words, prefetching in this manner reduces the cost of a cache miss and, therefore, improve microprocessor efficiency. Given the benefit of prefetching, however, this benefit is only realized if the LTB is able to accurately predict the data pattern for a given data fetching instruction. As detailed below, the present embodiments improve upon the prior art by providing prediction for certain data patterns.

Figure 2:
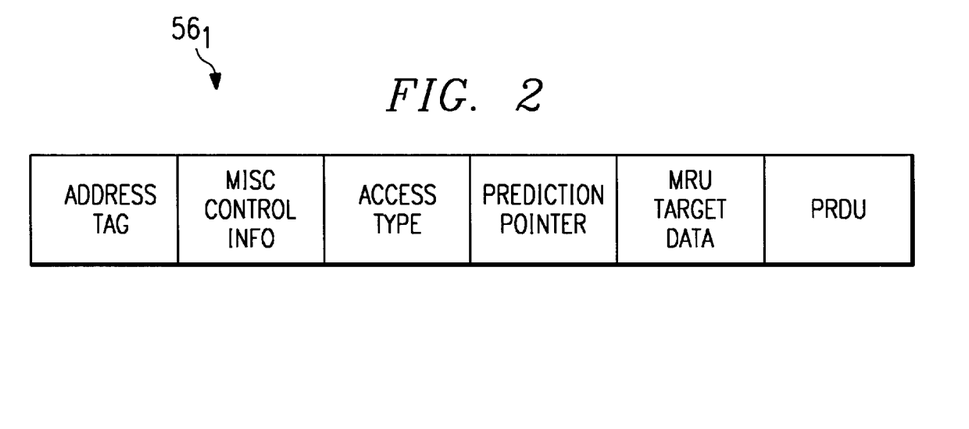
FIG. 2 illustrates an entry in an LTB, where the entry embodiment accommodates a data fetching instruction which executes using the same data as was used by the data fetching instruction during an immediately preceding incident of the instruction.

FIG. 2 illustrates a first embodiment of a single entry $56_1$ set forth in LTB 56 introduced above. Note that in the preferred embodiment, LTB 56 may include on the order of 2048 entries in an 8-way set associate structure, but only one entry of one way is shown in FIG. 2 with it understood that the remaining entries in the present embodiment have the same format. Generally, each entry in LTB 56 is operable to store information corresponding to a different data fetching instruction. Thus, up to 2048 different data fetching instructions may be identified in LTB 56 at a time. The specific formulation of each entry may be accomplished in various manners, and a brief introduction of the overall effect of LTB 56 is set forth here. In general, when a data fetching instruction is fetched by instruction fetch stage 40, LTB 56 is searched to determine if it stores an entry corresponding to that data fetching instruction. If not, then an entry is created and updated as detailed below. Once the entry is created, and provided it is set to a valid state, then as mentioned above it provides one or more predictions of the address of the data to be fetched by the data fetching instruction. In other words, suppose that a data fetching instruction is fetched by instruction fetch stage 40 and LTB 56 is found to have a valid entry corresponding to the data fetching instruction. In this instance, while the data fetching instruction is still at the relative top of instruction pipeline 38, the prediction from LTB 56 is used to issue a prefetch request for the data address predicted by the LTB entry. Consequently, in response to this request, the data may be prefetched to a cache or the like on the microprocessor chip. Thereafter, before or once the data fetching instruction reaches its execution stage, it may fetch the data directly from the cache, without having to access it from a memory external from the microprocessor. Thus, microprocessor efficiency is enhanced, as better appreciated from the following detailed discussion of entry $56_1$.

Turning to entry $56_1$, its first three values are general to the data fetching instruction, with the remaining three values directed to predictions for prefetching data corresponding to the data fetching instruction. Each of these values is described below.

Starting with the general values of entry $56_1$, its first value is an ADDRESS TAG. The ADDRESS TAG lists the address of where the data fetching instruction is stored in memory. The second value of entry $56_1$ includes MISCELLANEOUS CONTROL INFORMATION about the data fetching instruction, where such information may be analogous to information listed in a BTB for a branching instruction. For example, a valid indicator may be stored as part of this value so as to later determine whether the information in the entry is valid and may be relied upon by other circuitry analyzing such information. Other examples will be ascertainable by a person skilled in the art. The third value of entry $56_1$, is the ACCESS TYPE of the data fetching instruction. Various example of access types were earlier introduced. For example, a more straightforward access type is a fetch request, where the data fetching instruction seeks to retrieve (i.e., load) information from a certain memory location. As another example, however, the request may be a data store interrogate. In this case, the data store interrogate is a request to prepare some memory structure to receive data, but no data is actually retrieved. Alternatively, the request may be a data fetch store interrogate. Here, like the data store interrogate, the request again seeks to prepare some memory structure to receive data; in addition, however, here a group of data is retrieved into a cache as part of the preparation, with the anticipation that part of that group will be overwritten by a subsequent store to that group. Still other types of requests will be ascertainable by a person skilled in the art.

Looking to the prediction related values of entry $56_1$, the fourth value in entry $56_1$ is a PREDICTION POINTER. The PREDICTION POINTER is able to store a predicted target data address which corresponds to the data fetching instruction identified by the ADDRESS TAG. In other words, the address identified by the PREDICTION POINTER represents a prediction of the target data which will be used by the instruction and, therefore, provides an address of data which may be prefetched for the instruction associated with entry $56_1$.

The fifth value in entry $56_1$ is the MRU TARGET DATA. The MRU TARGET DATA identifies the most recently used ("MRU") target data for the data fetching instruction identified by the ADDRESS TAG. In other words, the MRU target data is either expressly set forth in entry $56_1$, or entry $56_1$, is correlated to some other storage which holds the MRU target data. In any event, in the present embodiment, each time the data fetching instruction identified by the ADDRESS TAG fetches data, that data is preferably stored in entry $56_1$ as the MRU TARGET DATA. Note that storing MRU TARGET DATA is known in the art, and in this regard the reader is referred to the article entitled "Value Locality and Load Value Prediction", by Mikko H. Lipasti, Christopher B. Wilkerson, And John Paul Shen, Carengie Mellon University, ACM 0-89791-767-7/96/0010, published in the Computer Architecture News, Vol. 24, October 1996, Special Issue, ASPLOS-VII Proceedings, which is hereby incorporated herein by reference. However, in the present embodiments, the MRU TARGET DATA is used in combination with other circuits and functionality not presented by the referenced article, and which are further appreciated by one skilled in the art given the additional description of FIGS. 4 and 5, below.

The sixth value in entry $56_1$ is a value identified as PRDU, which is an abbreviation for past repeated data use. The PRDU is better understood by first introducing the use of the MRU TARGET DATA provided in entry $56_1$, which is further detailed later. In this regard, the MRU TARGET DATA permits a data fetching instruction to execute speculatively using the same data as it used to execute for one or more immediately preceding incidents of the same instruction. In other words, in one aspect of the present embodiments, it is noted that for some data fetching instructions or for some program types or threads using those instructions, it is possible for an instruction to use the same data for repeated incidents of that instruction. For example, assume entry $56_1$ corresponds to such an instruction. Therefore, for a subsequent incident of that instruction through pipeline 38, and as detailed below, the present embodiment permits that subsequent incident to speculatively execute the instruction using the MRU TARGET DATA. In other words, this operation is effectively a prediction that the subsequent incident will once again use the same data (i.e., the MRU TARGET DATA) that it has used in one or more previous incidents. Thereafter, the actual data for the present incident of the instruction is fetched and used to confirm that the speculation was correct. Specifically, once the actual fetched data is available, it is compared to the MRU TARGET DATA. If a match occurs, then the speculative execution reached a correct result, that is, the same result as would have been reached had the actual fetched data been used. Given this possibility, note now the measure provided by the past repeated data use value, PRDU. Specifically, PRDU is a measure of how accurate the past speculation executions have been, that is, how accurate it has been to speculatively use the MRU TARGET DATA. This measure may be encoded and updated in PRDU in various manners, where the following represents a few preferred techniques. Note, however, that various additional implementations may be ascertained by a person skilled in the art given the current teachings.

As a first example of encoding the value of PRDU, note from the preceding paragraph that sufficient information is available to compare the MRU TARGET DATA and the actual target data for a given incident of a data fetching instruction. Thus, in one embodiment, PRDU is a count which advances in a first direction in response to an match of the MRU TARGET DATA and the actual target data, where the count advances in a second direction opposite the first direction in response to a mis-match between those two values. For example, the first direction may be incrementing such that the counter is incremented each time the compared data match and, therefore, the second direction is decrementing such that counter is decremented each time the compared data do not match. Consequently, the higher the count of PRDU, the more the instruction at issue has recently repeatedly used the same data to complete its execution. Moreover, the greater the number of bits in the count, the greater the resolution in its indication. In the preferred embodiment, a five-bit count is used so the count may reflect up to thirty-two successive correct or incorrect data uses. Moreover, note further that the count is preferably first established at the same time the entry is created in LTB 56 for a given data fetching instruction, and that the initial value of the count is set at some mid-range between its extremes. Thus, for the example of a five-bit counter, its extremes are 0 to 31, so it preferably is initialized to a value of 15 (i.e., binary 01111) or 16 (i.e., binary 10000). Note that by initializing the count to a mid-range in this manner, its initial indication does not favor either one extreme or the other, that is, at that point the PRDU does not wrongfully suggest that there have been past incidents of either proper or improper prediction. Instead, the immediately following incidents of the corresponding data fetching instruction are able to change the count value toward an indication of either proper or improper use of the MRU TARGET DATA by either incrementing or decrementing the count as described above.

Figure 3:
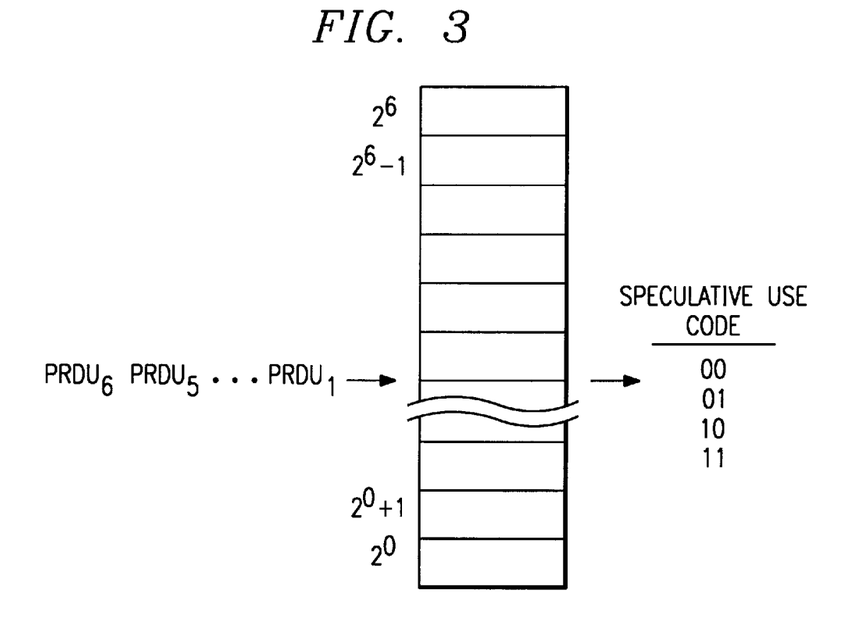
FIG. 3 illustrates a programmable table for receiving past occurrences of the PRDU value and outputting an indicator representative of the past history of those occurrences.

As a second example of encoding the value of PRDU, note also that the PRDU value may record the past determinations of whether the MRU TARGET DATA and the actual target data match as a sequential history. For example, a six-bit PRDU field could demonstrate in time fashion the last six states of the comparison between these two data quantities. Thus, if four occurrences of an accurate re-use of the data were followed by two occurrences of use of different data, and if a match were indicated by a logic high signal, then the six-bit PRDU field would indicate 111100. Thus, a field with more 1's than 0's would indicate a higher recent incidence of re-using the same data. Indeed, rather than only evaluating the number of 1's and 0s in the PRDU field encoded in this fashion, note as still an additional alternative that FIG. 3 illustrates a programmable table 58 for receiving the PRDU value and outputting a speculative use code based on the past six occurrences of that value, where the speculative use code is a conclusion of whether it is desirable to speculatively use the MRU TARGET DATA for the current instance of the data fetching instruction at issue as better appreciated later. In any event, note initially that programmable table 58 is located somewhere on microprocessor 12. Moreover, recall that the current embodiment of PRDU keeps a history of six of the past incidents of that value. In FIG. 3, each of these values is shown in succession. For example, the value designated $PRDU_1$ is intended to represent the least recently stored value, while the value designated $PRDU_2$ is intended to represent the value coming in time after the least recently stored value, and so forth through the value designated $PRDU_6$. Given six bits in this fashion, the total 6-bit sequence is used as an address to programmable table 58. Note also as an alternative that some subset of these bits, that is, less than all six bits, could be used to address programmable table 58. In any event, given that the values of PRDU may differ for any given incident of a data fetching instruction, there are a total of $2^6$ possible combinations of the values of PRDU over six successive incidents of those values. Thus, programmable table 58 includes 64 (i.e., $2^6$) different addressable locations, where each location stores a speculative use code as described below.

The speculative use code provides an indication of whether, based on the last six incidents of PRDU, the MRU TARGET DATA should be used to speculatively execute the current incident of the data fetching instruction, given the history of PRDU values as represented by the 6-bit input. As detailed below, note also that the speculative use code output in response to a first instance of an input sequence may be changed so that a different speculative use code is output in response to a second instance of the same input sequence. In this latter capacity, note that programmable table 58 is referred to as programmable because the output speculative use code corresponding to any of the 64 bit combinations may be changed during operation of microprocessor 12. Table 1 below depicts the four possible speculative use codes and is followed by a discussion of the interpretation and effect of those codes.

TABLE 1

| Speculative Use Code | Speculative use (i.e., re-use of MRU TARGET DATA) desired? | Next speculative use code if PRDU = 1 | Next speculative use code if PRDU = 0 |
| --- | --- | --- | --- |
| 00 | yes | 00 | 01 |
| 01 | yes | 00 | 10 |
| 10 | no | 01 | 11 |
| 11 | no | 10 | 11 |

Table 1 demonstrates whether a speculative use operation is desirable for a given output speculative use code, and further whether that code should be changed based on a current incident of a data fetching instruction. For example, suppose that $PRDU_1$ through $PRDU_6$ equal a sequence of 111111. Thus, for each of a first through a sixth incident of a data fetching instruction, the actual data has matched the MRU TARGET DATA for the data fetching instruction. Therefore, to speculatively execute the next incident of the data fetching instruction again using the MRU TARGET DATA would be highly beneficial. Consequently, for the seventh incident of the data fetching instruction, programmable table 58 is addressed at its address of 111111 and suppose it outputs a speculative use code of 00. From the second column of Table 1, this code equal to 00 indicates that it is desirable to once again speculatively execute the data fetching instruction using the MRU TARGET DATA. Therefore, for this seventh incident, speculative use will occur. However, assume further that this seventh incident of the data fetching instruction produces an actual fetched data which does not match the MRU TARGET DATA (i.e., PRDU=0 for this seventh incident and the speculative use was not appropriate). Thus, the value of PRDU equal to 0 is added as the most recent bit of the 6-bit PRDU field and, for the next data fetching instruction, that is, for the eighth incident, programmable table 58 will be addressed at its address of 111110 to output the appropriate speculative use code. In addition, however, the current value of PRDU from the seventh incident is used in response to graduating the data fetching instruction for the seventh instance, to update the speculative use code from the preceding incident (i.e., the value of 00 output in response to the address of 111111 used for the sixth incident) if such an update is necessary. Specifically, since the value of PRDU is now zero due to the mis-match of the actual fetched data and the MRU TARGET DATA, then according to the fourth column of Table 1, the speculative use code for address 111111 should be changed from 00 to 01. Thus, the next time the address 111111 is input to programmable table 58, it will output a value of 01 rather than 00. From this example, note then that the above may repeat at some later time, once again changing the speculative use code corresponding to the address 111111, either back to 00 or even to 10 (suggesting a speculative use is not desirable).

The above discussion of programmable table 58 suggests a single programmable table 58 to be used by all LTB entries. However, note that in an alternative embodiment multiple tables could be used, even to the point where each LTB entry had its own corresponding programmable table 58. In this latter event, however, note that the amount of input bits (i.e., the amount of history for PRDU) is preferably reduced. Otherwise, each of the 2048 LTB entries would require its own 64 bit programmable table which may or may not be larger than desirable for some applications. As yet another alternative, note further that entries for some data fetching instructions could access one programmable table while entries for other data fetching instructions access a different programmable table. For example, recall that the LTB entries may include an ACCESS TYPE value and, thus, one type of data fetching instruction could access a first programmable table while another type of data fetching instruction could access a second programmable table. Still other examples may be ascertained by one skilled in the art.

FIG. 4 again illustrates microprocessor 12 from FIG. 1, but to focus the current explanation simplifies and groups certain items, eliminates others, and adds still additional features consistent with yet other embodiments. Nevertheless, to facilitate an understanding of the common features, like reference numerals are used for those items which are the same or comparable to those discussed above in connection with earlier Figures. Additionally, however, note that many other configured and/or types of microprocessors may implement, and benefit from, various of the concepts disclosed herein. In any event, turning to FIG. 4, pipeline 38 is shown generally in block form, and is bi-directionally connected to LTB 56 for purposes of accomplishing the functionality described below. LTB 56 may include numerous entries as described above, but for purposes of the present discussion only entry $56_1$ from FIG. 2 is shown in detail. The MRU TARGET DATA value of entry $56_1$ is connected to a prefetch buffer designated generally at 100. More specifically, prefetch buffer 100 includes a line having four values 100a through 100d. As further appreciated below, the MRU TARGET DATA from entry $56_1$ may be copied to a TARGET DATA value 100a of prefetch buffer 100. Moreover, this TARGET DATA, whether representing the MRU TARGET DATA or some other data described below, may be fetched from prefetch buffer 100 and used by an instruction passing through pipeline 38. The remaining values 100b, 100c, and 100d, of prefetch buffer 100 each are preferably single bit flags which, based on the state of each flag, represent a corresponding condition detailed below. Briefly introducing those conditions, the VALID FLAG 100b when set indicates that the TARGET DATA 100a is valid and, therefore, may be fetched by an instruction. The SPECULATIVE FLAG 100c when set indicates that the TARGET DATA is a copy of the MRU TARGET DATA from LTB 56 and has not been overwritten by data from memory. The IN-USE FLAG 100d when set indicates that the speculative data stored as the TARGET DATA 100a has been used by a data fetching instruction. Lastly, note that prefetch buffer 100 is shown as having a single line in FIG. 4 to thereby accommodate a single data fetching instruction. However, in the preferred embodiment multiple such lines may be included in prefetch buffer 100 so that each line includes the same values as shown in the single line FIG. 4, where each of those multiple lines may accommodate corresponding multiple data fetching instructions.

Figure 4:
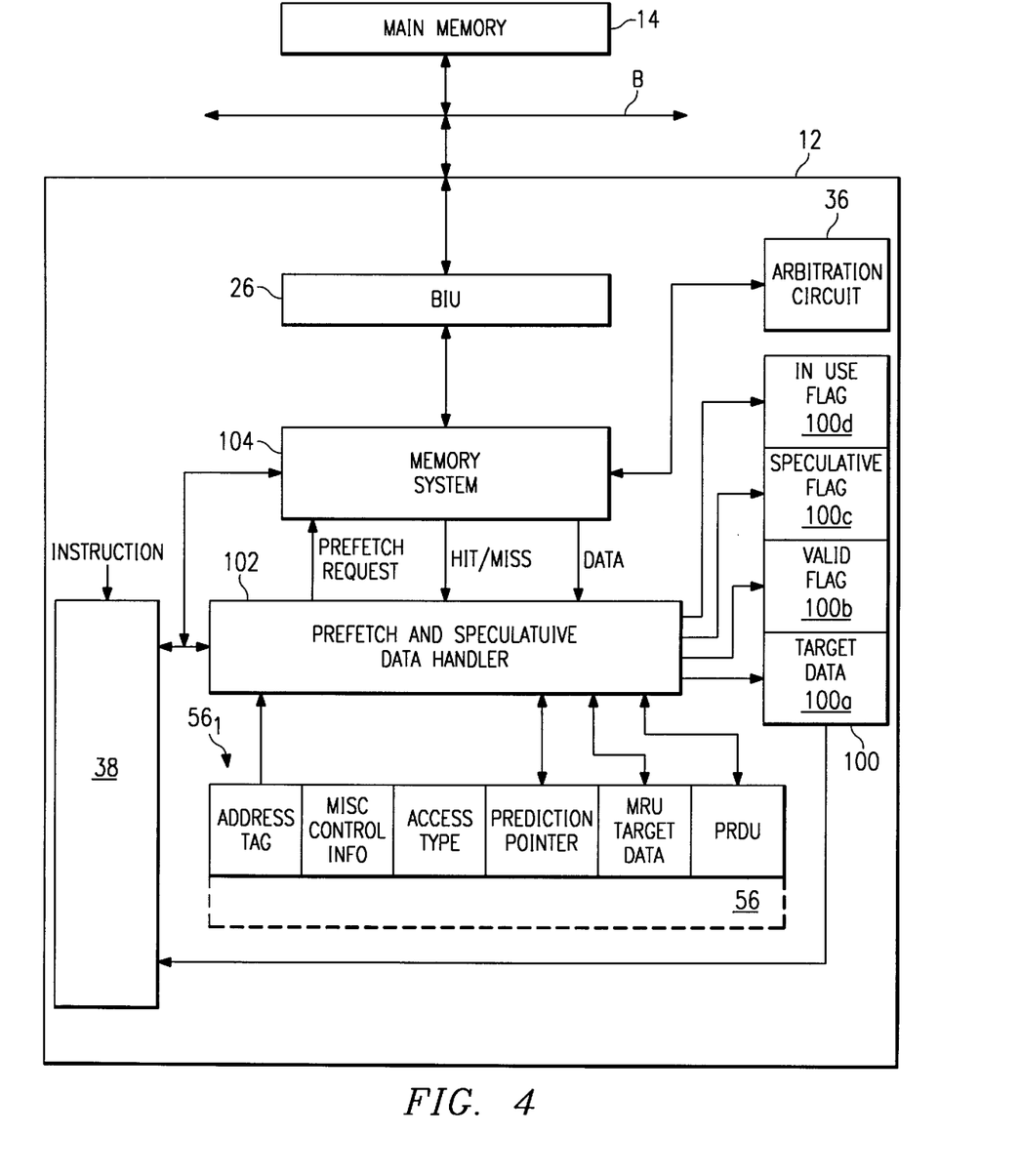
FIG. 4 illustrates the microprocessor of FIG. 1 with modifications to speculatively execute a data fetching instruction using the same data as was used by the data fetching instruction during an immediately preceding incident of the instruction.

Certain values from entry $56_1$ as well as prefetch buffer 100 are connected to a prefetch and speculative data handler 102 for purposes of accomplishing various methodology as detailed later. Indeed, note also that the following details will enable one skilled in the art to construct various different types of circuits to accomplish the desired functionality set forth below. As an introduction to that functionality, note that prefetch and speculative data handler 102 may detect an address hit in LTB 56, may read the PRDU and PREDICTION POINTER values from entry $56_1$, and may write each of the values of prefetch buffer 100. Moreover, prefetch and speculative data handler 102 is connected to present a prefetch request to an on-chip memory system 104. Note that memory system 104 represents a grouping of one or more of the on-chip hierarchical memory structures within microprocessor 12. For example, in the preferred embodiment, memory system 104 includes L2 unified cache 20 shown in FIG. 1, above, and further assumes that L2 unified cache 20 is downward inclusive, that is, it stores an information which is also stored in any cache lower than it in the memory hierarchy. However, other memory systems shown in FIG. 1 (e.g., lower level caches) as well as other types of memory systems in general also may be implemented within memory system 104, as will be appreciated by one skilled in the art. In any event, in response to receiving a prefetch request, memory system 104 determines whether the target data is located within its memory. If a cache hit occurs within memory system 104, then it issues a hit signal as a control signal back to prefetch and speculative data handler 102. On the other hand, if the requested target data is not within memory system 104, then it issues a miss signal as a control signal back to prefetch and speculative data handler 102, and it also prefetches the requested data from either on-chip storage higher in the memory hierarchy than memory system 104, or from an off-chip resource such as from main memory 14. Upon receiving the prefetched data, it is passed by memory system 104 to prefetch and speculative data handler 102 which, as detailed below, copies that data to the TARGET DATA 100a of prefetch buffer 100. Lastly, the above-described search through memory system 104 and to a higher memory system (e.g., main memory 14) are performed under control of one or more circuits and, therefore, arbitration circuit 36 is once again shown to generally depict such control functionality.

Figure 5:
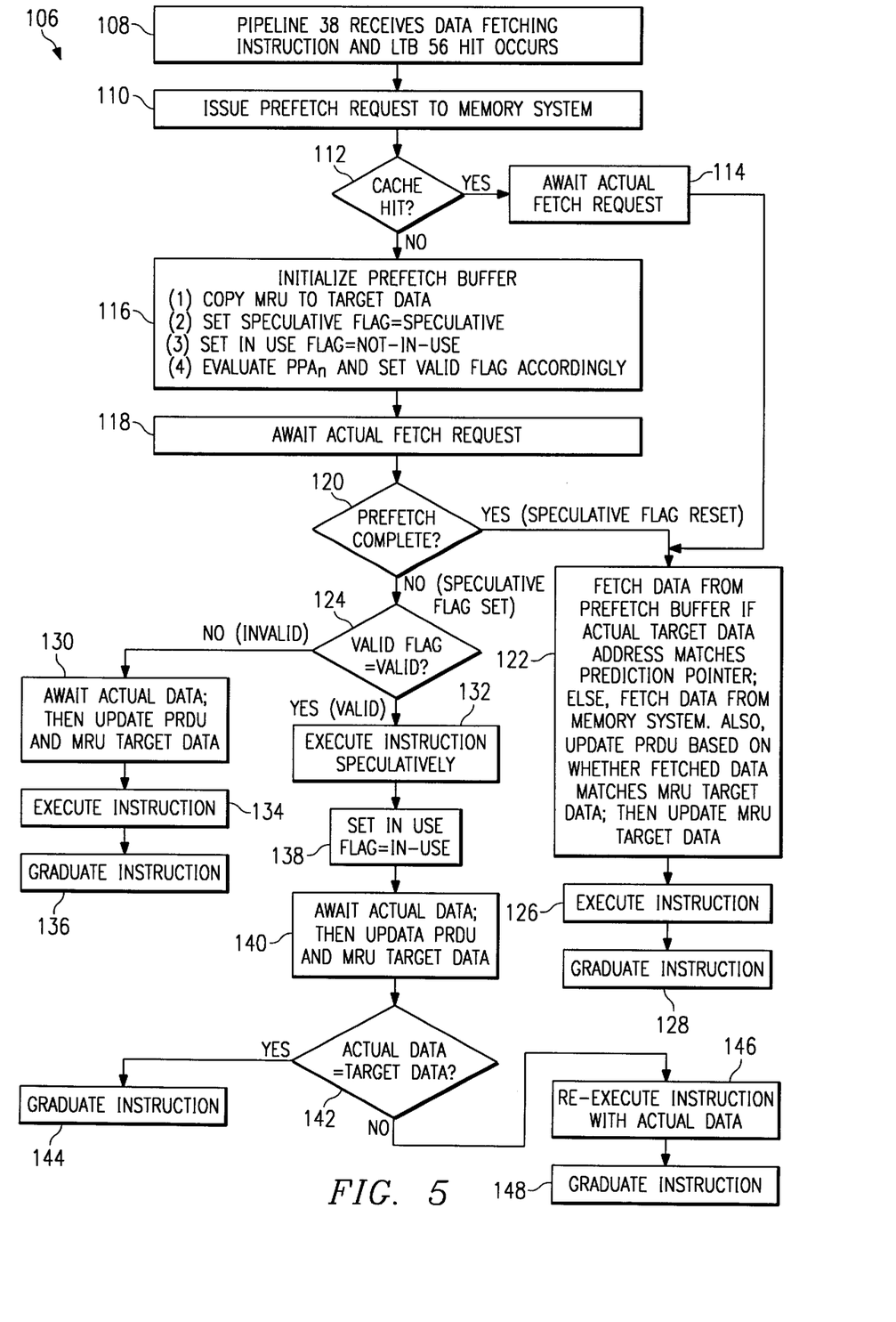
FIG. 5 illustrates a method of operation for the circuitry of FIG. 4 to speculatively execute an instruction using its most recently used data while concurrently prefetching data for the instruction.

FIG. 5 illustrates a method of operation of the circuits of FIG. 4, where the method is designated generally at 106. Before detailing the many steps of method 106, an introduction to some of its overall capabilities is instructive. In general, recall from above that when a data fetching instruction is retrieved into pipeline 38, a prefetch request is issued if LTB 56 stores a predicted target data address in its PREDICTION POINTER for the data fetching instruction. As mentioned earlier, recall further that some data fetching instructions may fetch the same data as fetched by the immediately preceding incident of that same instruction. Note now that entry $56_1$ of FIG. 2 stores this very data, that is, the data from the preceding incident of the instruction, as the MRU TARGET DATA. Thus, in general, if a data fetching instruction is processed through the embodiment of FIG. 4 where that instruction will use the same data for two or more successive incidents, then this MRU TARGET DATA is available without having to fetch it from either memory system 104 or some memory higher in the memory hierarchy. In other words, the data fetching instruction may execute under the speculation that its data for the current incident is the same as it was for the immediately preceding incident of that same instruction. Consequently, in the embodiment of FIG. 4, the MRU TARGET DATA is copied to the TARGET DATA 100a in prefetch buffer 100 and, therefore, may be fetched from that buffer by the successive incident(s) of the data fetching instruction. As further detailed below, however, the FIG. 4 embodiment also prefetches the data identified by the PREDICTION POINTER to overwrite the MRU TARGET DATA and, thus, depending on various timing considerations set forth below, the prefetched information may be available in sufficient time so that it may be used if the MRU TARGET DATA is not the appropriate data. Still additional considerations are set forth below in connection with method 106.

Method 106 begins with step 108 which indicates that pipeline 38 receives a data fetching instruction which is detected as such an instruction, and a hit occurs in LTB 56;

in other words, an entry corresponding to the data fetching instruction is found within LTB 56. As an example to discuss through the remainder of FIG. 5, assume that the hit is in entry $56_1$. Moreover, note further that if no hit occurs in LTB 56, then method 106 is not commenced and, instead, a new entry is created in LTB 56. Assuming a hit in LTB 56, method 106 continues to step 110. Step 110 issues a prefetch request corresponding to the data fetching instruction. In the present embodiment, therefore, prefetch and speculative data handler 102 issues a prefetch request to memory system 104 for data at the predicted target data address identified by the PREDICTION POINTER. In the preferred embodiment, a prefetch operation then commences in response to this request Thus, initially memory system 104 determines whether the requested data is stored in that system. In response, system 104 responds to prefetch and speculative data handler 102 with either a hit or miss signal. If a miss occurs, then the prefetch operation continues until the requested data is located and brought on-chip, such as retrieving that information from main memory 14 into memory system 104. Note that this retrieval may take numerous clock cycles; therefore, while this retrieval process is occurring, various of the remaining steps of method 106 may take place to produce overall improved performance as better appreciated below.

Step 112 determines whether an initial cache hit occurred from the prefetch request issued in step 110. If an initial cache bit occurred, then method 106 continues to step 114. Step 114 as well as its subsequent steps are detailed below. If an initial cache miss occurred, then method 106 continues to step 116. Step 116 initializes an entry of prefetch buffer 100 to correspond to the entry of LTB 56 at issue. Thus, in the example of a single entry as shown in prefetch buffer 100 of FIG. 4, for the present example this single entry is initialized to correspond to entry $56_1$ of the current example. During the initialization, prefetch and speculative data handler 102 provides initial values for the TARGET DATA 100a as well as the three flags of prefetch buffer 100, each of which is discussed below.

With respect to the TARGET DATA 100a of prefetch buffer 100, recall it may be fetched and used by an instruction passing through pipeline 38. Moreover, because the present embodiment may allow such an instruction to speculatively execute based on the MRU TARGET DATA from entry $56_1$, then during the initialization of step 116 this MRU TARGET DATA 100a is copied from entry $56_1$ to the TARGET DATA 100a of prefetch buffer 100. As detailed below, after this initialization the data fetching instruction will execute using the TARGET DATA 100a but by that point the TARGET DATA 100a which initially stores the MRU TARGET DATA may have been overwritten by prefetched data from memory system 104. Thus, eventually the data fetching instruction may execute using either speculative data (i.e., the MRU TARGET DATA) or prefetched data from memory system 104 according to which is, at that time, stored as the TARGET DATA 100a.

With respect to the SPECULATIVE FLAG 100c of prefetch buffer 100, recall that when set to speculative it indicates that the TARGET DATA is a copy of the MRU TARGET DATA from LTB 56 and has not been overwritten by prefetched data from memory. Thus, because the TARGET DATA is initialized to store the MRU TARGET DATA 100a as discussed immediately above, then also during initialization the SPECULATIVE FLAG 100c is set to indicate the speculative status of the TARGET DATA 100a. In other words, the present embodiment is speculating that the current incident of a data fetching instruction may use the same data as used by the immediately preceding incident of that instruction. Therefore, the MRU TARGET DATA is defined to be speculative and so the SPECULATIVE FLAG 100d is set accordingly. As detailed later, however, if the TARGET DATA 100a is overwritten by actual data from memory system 104, then the SPECULATIVE FLAG 100c is reset to indicate the TARGET DATA 100a is no longer speculative.

With respect to the IN-USE FLAG of prefetch buffer 100, recall that when it is set it indicates that the MRU TARGET DATA 100a copied to the TARGET DATA 100a has been used by a data fetching instruction. Thus, when the prefetch buffer 100 is initialized, at that point the data fetching instruction clearly has not had an opportunity to execute using the TARGET DATA 100a. Thus, the IN-USE FLAG 100d is initialized to indicate a not-in-use status.

Lastly, with respect to the VALID FLAG 100b of prefetch buffer 100, recall that when it is set to valid it indicates that the TARGET DATA 100a may be fetched by an instruction. Conversely, therefore, if the VALID FLAG 100b is set to invalid, then the TARGET DATA 100a may not be fetched by an instruction. It is in this context that a use of the value of PRDU arises. More particularly, recall that PRDU represents an indication of the past repeated use of the same target data. Given that indication, the present inventors provide it so that relatively frequent past repeated uses increase the probability that the MRU TARGET DATA should be similarly use for subsequent incidents of a given data fetching instruction, while conversely relatively infrequent past repeated uses decrease the probability that the MRU TARGET DATA should be similarly use for subsequent incidents of a given data fetching instruction In other words, the relative value of PRDU indicates the potential worthiness of using the MRU TARGET DATA for the current incident of the data fetching instruction. Thus, if the value of PRDU is relatively low, then it may be that the current incident of the data fetching instruction is not likely to use the same data is it did for its immediately preceding incident. Conversely, if the value of PRDU is relatively high, then it may be that the current incident of the data fetching instruction is likely to use the same data is it did for its immediately preceding incident. Thus, during the initialization of step 116, prefetch and speculative data handler 102 evaluates the value of PRDU and, based upon a threshold which may be selected by one skilled in the art, sets the VALID FLAG 100b accordingly. For example, if PRDU is embodied in a five-bit count as demonstrated earlier, and if the current PRDU is lower than 11000, then prefetch and speculative data handler 102 sets the VALID FLAG 100b to an invalid state. Thus, the MRU TARGET DATA stored as the TARGET DATA 100a will not thereafter be used by the current incident of the data fetching instruction, as further appreciated from additional steps described below. Also given that example, therefore, if the current PRDU is equal to or greater than 11000, then prefetch and speculative data handler 102 sets the VALID FLAG 100b to a valid state.

Having initialized prefetch buffer 100 to potentially permit the data fetching instruction to use, for the current incident, the same MRU TARGET DATA as was used by its previous incident, method 106 next proceeds to step 118. Step 118 awaits the actual fetch request corresponding to the data fetching instruction. In other words, at some point the data fetching instruction passes sufficiently along pipeline 38 such that an actual target address is issued to fetch the data to complete execution of the data fetching instruction. Step 118, therefore, includes a wait period until this event occurs, after which method 106 continues to step 120.

Step 120 represents a condition check in connection with the completion of prefetching. Thus, to further appreciate step 120, first is presented a discussion of the consequences of the prefetch activity. Recall that step 110 earlier issued a prefetch request, and that method 106 reaches step 120 if a prefetch miss occurred at the lowest level of cache in memory system 104 (or only level if only one level is included in system 104). Thus, for the time from step 112 to step 120, a prefetch operation corresponding to the prefetch request may have been completed, that is, the data at the predicted target data address (i.e., the address identified by the PREDICTION POINTER) may have been retrieved from some higher memory level storage into memory system 104. In the present embodiment, when this prefetch retrieval is complete, prefetch and speculative data handler 102 overwrites the TARGET DATA 100a in prefetch buffer 100 with the prefetched target data. Moreover, because the TARGET DATA 100a is, by definition, no longer speculative, then the SPECULATIVE FLAG 100c is reset to not speculative. Still further, to make the prefetched data, now stored as the TARGET DATA 100a available for subsequent use by the data fetching instruction, then the VALID FLAG 100b is set to valid (if it was not already set as such in step 116). Given the above, note further that these consequences are not reached until the prefetch operation is complete. In other words, prior to the completion of the prefetch operation, prefetch buffer 100 remains set as it was after the initialization of step 116 (i.e., MRU TARGET DATA 100a is copied to the TARGET DATA 100a and the flags are set as detailed above). In any event, step 120 determines, having received an actual fetch request, whether the prefetch operation is complete. In the preferred embodiment, this step may be accomplished by examining the SPECULATIVE FLAG 100c. If the SPECULATIVE FLAG 100c is set to not speculative, then from the above note that the prefetch operation is complete. In this case, method 106 continues to step 122. On the other hand, if the SPECULATIVE FLAG 100c is set to speculative, then the prefetch operation is not complete and method 106 continues to step 124. Each of these alternative paths is discussed below.

From the above, note that step 122 may be reached once prefetch buffer 100 has been initialized, but further where the result of the prefetch operation was returned to overwrite TARGET DATA 100a as of the time (or slightly after) the actual fetch request was issued. Thus, step 122, in response to the actual fetch request, fetches the data for the data fetching instruction. Specifically, if the prefetch target data address (i.e., from the PREDICTION POINTER) matches the actual target data address, then the prefetch prediction was accurate and the target data is fetched from the TARGET DATA 100a in prefetch buffer 100. On the other hand, if the prefetch target data address does not match the actual target data address (i.e., the prefetch prediction was inaccurate), then the target data is fetched from memory system 104. Next, step 126 completes the execution of the data fetching instruction using the data fetched in step 122. In this regard, note that it is stated that this step "completes the execution" because the fetch action of step 122 may actually be part of the execution for certain data fetching instructions. For example, a load instruction actually fetches its information during execution of the instruction. For other data fetching instructions, however, they may fetch their corresponding data as they are in an earlier stage in pipeline 38, that is, before they being the execution stage. Still other examples may be ascertained by one skilled in the art. In any event, step 126 is intended to include both types of data fetching instructions, that is, those that perform the actual fetch either before execution and those that perform the actual fetch during execution. For either type, therefore, the execution stage of the instruction is completed using the fetched data. In addition to completing execution in step 126, recall that the entry corresponding to the data fetching instruction at issue is updated. In this regard, first the data which was used for the current execution of the instruction is compared with the MRU TARGET DATA to update the value of PRDU (e.g., increment PRDU if a match, decrement PRDU if a mis-match). Second, the fetched data is usually also written to the MRU TARGET DATA of entry $56_1$. Note further, however, that this second step is only stated to usually occur; this is because, in the preferred embodiment, the value of PRDU may be used to prevent this second step. Specifically, note that a high value of PRDU may be used to prevent the overwriting of the MRU TARGET DATA with the fetched data. In other words, if PRDU is very high then there has been a recent high incidence of repeated use of the same data. Thus, for the current incident, if the fetched data does not match the data already stored as the MRU TARGET DATA, it may be worthwhile to retain the older data under the assumption, as suggested by the high value of PRDU, that the older data will again be used for the next incident of the data fetching instruction. Thus, as an alternative to overwriting the MRU TARGET DATA, a high PRDU value may be used to merely maintain the most recently used data in favor of the currently fetched data. Lastly, step 128 graduates the data fetching instruction, thereby completing method 106 as to that instruction Having discussed steps 122, 126, and 128, note now that step 122 also may be reached from step 114. Recall in connection with step 112 above that method 106 continues to step 114 if a cache hit occurs in memory system 104 following the prefetch request. In the preferred embodiment, because of this cache hit, it is preferable merely to use the benefit of the prefetch request rather than incurring the additional steps described below in connection with possible speculative instruction execution. Thus, step 114 awaits the actual fetch request as in the same case as step 118 described above. Once the actual fetch request arrives, method 106 continues to step 122 which, as described above, fetches the data from an appropriate location, updates entry $56_1$, and thereafter steps 126 and 128 execute and graduate the instruction, respectively, using the fetched data.

Returning to step 124, note that it is reached once prefetch buffer 100 has been initialized, but further where the result of the prefetch operation has not yet been returned to overwrite TARGET DATA 100a as of the time (or slightly after) the actual fetch request was issued. In other words, when step 124 is reached, only the speculative MRU TARGET DATA is available to allow the data fetching instruction to speculatively complete its execution using that data, and that data is located as the TARGET DATA 100a in prefetch buffer 100. Given these considerations, step 124 evaluates the setting of the VALID FLAG 100b. If the VALID FLAG 100b is set to invalid, then recall this indicates that an earlier determination was made that it will likely produce an erroneous result to complete execution of the data fetching instruction using the MRU TARGET DATA. Thus, in response to a VALID FLAG 100b of invalid, method 106 passes control from step 124 to step 130. On the other hand, in response to a VALID FLAG 100b of valid, method 106 passes control from step 124 to step 132. Each of these alternative paths is described below.

Step 130 is reached when prefetch buffer 100 is initialized to stored the MRU TARGET DATA 100a as its TARGET DATA 100a, but also where that data has been identified as invalid (i.e., likely not to produce a valid result if used to complete execution of the data fetching instruction). Thus, step 130 awaits the actual target data as it should return from memory system 104. Note, however, that the earlier prefetch request from step 110 may cause this target data address to arrive sooner in memory system 104 than it would have without a prefetch request. Therefore, if the prefetch target data address matches the actual target data address, then the prefetch prediction was accurate and the actual fetch request should receive the requested target data earlier than it would have without the prefetch request. On the other hand, if the prefetch target data address does not match the actual target data address (i.e., the prefetch prediction was inaccurate), then the target data will not reach memory system 104 and be available for execution until a time period as measured from the actual fetch request from step 118. Once the proper target data is available, step 134 completes execution of the data fetching instruction using the actual target data, and step 136 thereafter graduates that data fetching instruction.

Step 132 is reached when prefetch buffer 100 is initialized to store the MRU TARGET DATA 100a as its TARGET DATA 100a, where that data has been identified as valid, and where the prefetch operation has not had sufficient time to complete and overwrite the MRU TARGET DATA with the predicted target data. Thus, step 132 completes execution of the data fetching instruction speculatively, that is, the data fetching instruction executes using the speculation that the instruction execution uses the same data as it did for its immediately preceding incident. In the present embodiment, therefore, the data fetching instruction completes execution using the MRU TARGET DATA as it has been stored in prefetch buffer 100. Moreover, and preferably either at the same time or very nearly at the same time, step 138 sets the IN-USE FLAG 100d to indicate the speculative data is in use for reasons more apparent below. Thereafter, method 106 continues to step 140.

Step 140, like step 130 described above in an alternative path of method 106, awaits the actual target data as it should return from memory system 104. Again, therefore, note that the earlier prefetch request from step 110 may cause this target data address to arrive sooner in memory system 104 than it would have without a prefetch request. Thus, if the prefetch target data address matches the actual target data address, then the prefetch prediction was accurate and the actual fetch request should receive the requested target data earlier than it would have without the prefetch request. On the other hand, if the prefetch target data address does not match the actual target data address, then the target data will not reach memory system 104 and be available for execution until a sufficient amount of time following the actual fetch request from step 118. In any event, once the proper target data is available, the entry corresponding to the data fetching instruction at issue is updated. Again, therefore, first the data which was used for the current execution of the instruction is compared with the MRU TARGET DATA to update the value of PRDU (e.g., increment PRDU if a match, decrement PRDU if a mis-match). Second, the fetched data is also written to the MRU TARGET DATA of entry $56_1$. Next, method 106 continues to step 142.

Step 142 determines whether the actual target data matches the speculative TARGET DATA 100a from prefetch buffer 100. Note that step 142 is instigated by prefetch and speculative data handler 102 because the IN-USE FLAG 100d is set to in-use in step 138, thereby requiring the actions set forth below. Specifically, the in-use setting means that the data fetching instruction has been speculatively executed using the TARGET DATA 100a, where that TARGET DATA 100a was the same target data as used by the immediately preceding incident of that data fetching instruction. Step 142, therefore, determines whether this speculation was correct, that is, whether the data from the previous incident was the same as that which was requested in the current incident. If so, step 144 graduates the executed data fetching instruction. On the other hand, if the actual target data does not match the speculatively-used data, then the results of the speculatively-executed data fetching instruction are erroneous. Consequently, in this event step 146 re-executes the data fetching instruction using the actual target data rather than the speculative data. In addition, step 146 may further implement other principles known in the art for out-of-order execution in the event that at this point any other instruction(s) or hardware have relied on the result of the erroneously-executed instruction. Once the erroneous result(s) is re-calculated and cured, step 148 graduates the correctly executed data fetching instruction.

From the above note that the embodiments of FIGS. 1 through 5 provide numerous alternative method paths, where those paths together provide various benefits for data fetching instructions which may use the same data for successive incidents of such an instruction. For example, in some instances, the most recently used data is saved and available for speculative execution by subsequent incidents of a data fetching instruction. As another example, at the same time the most recently used data is available, a prefetch operation retrieves data for the data fetching instruction according to a predicted target data address for that instruction. Thus, where the speculative data is used, then once the prefetch operation returns predicted data that data (provided the prediction is accurate) may be compared to confirm the speculative data was correct, and at a time potentially earlier than would be required to make that confirmation if no prefetch operation had taken place. In addition to these benefits, various alternatives have set forth above which demonstrate the flexibility of the inventive scope. Still other alternatives are possible as well. For example, while prefetch buffer 100 is shown as a separate storage structure, its information could be included in existing memory structures, such as within one of the on-chip caches. As another example, while the MRU TARGET DATA 100a may directly store the actual data used by one or more earlier incidents of the corresponding data fetching instruction, in an alternative embodiment the MRU TARGET DATA could merely provide an identification or control signal which otherwise leads to that data. For example, such a control signal may, in some states, indicate a fixed value corresponding to the control signal, while in other states indicate that some other resource stores the actual data. Note that his latter possibility may lower the overall storage requirements, because a single storage resource could store a single value, and multiple entries in LTB 56 could then reference that same storage resource. Thus, one skilled in the art will appreciate these benefits and alternatives as well as others, and therefore while the present embodiments have been described in detail, various substitutions, modifications or alterations could be made to the descriptions set forth above without departing from the inventive scope which is defined by the claims set forth at the end of this document.

We claim:

1. A method of operating a microprocessor having an on-chip storage resource, comprising:

first, receiving a data fetching instruction into an instruction pipeline from an instruction memory at a first time, wherein the instruction pipeline has a preliminary stage, a plurality of stages following the preliminary stage, and an execution stage following the plurality of stages, wherein the step of receiving a data fetching instruction at the first time comprises receiving the data fetching instruction in the preliminary stage;

second, the steps of:
  fetching a first data quantity for the data fetching instruction to complete the execution stage of the pipeline in response to receiving the data fetching instruction at the first time;
  completing the execution stage in connection with the data fetching instruction using the first data quantity; and
  storing the first data quantity and an address within the instruction memory where the corresponding data fetching instruction is stored as an entry in the on-chip storage resource;

third, receiving a further instruction into the preliminary stage;

fourth, determining the further instruction is a data fetching instruction if the address within the instruction memory where the further instruction is stored equals the address of a previously received data fetching instruction stored within the on-chip resource;

fifth, in response to determining the further instruction is a data fetching instruction, issuing a prefetch request for a prefetched data quantity for the data fetching instruction to complete the execution stage of the pipeline; and sixth, in response to determining the further instruction is a data fetching instruction, completing the execution stage in connection with the data fetching instruction using a predetermined data quantity, wherein the predetermined data quantity is selected from a group of quantities comprising the first data quantity in the on-chip resource corresponding to the instruction memory address where the further instruction is stored and the prefetched data quantity.

2. The method of claim 1:
wherein the on-chip storage resource comprises a prefetch buffer; and
further comprising, after the second steps and prior to the fifth step, the step of copying the first data quantity from the load target buffer entry to the prefetch buffer.

3. The method of claim 1:
wherein the on-chip resource comprises a prefetch buffer; and further comprising the steps of:
  receiving the prefetched data quantity in response to the step of issuing a prefetch request; and
  prior to the sixth step, overwriting the first data quantity in the prefetch buffer entry with the prefetched data quantity.

4. The method of claim 3 wherein the sixth step selects the prefetched data quantity from the prefetch buffer.

5. The method of claim 1 wherein the first data quantity corresponding to the instruction memory address where the further instruction is stored is selected from the group of data quantities to speculatively execute the data fetching instruction in response to detecting that the prefetched data quantity has not returned in response to the prefetch request at a time when the data fetching instruction reaches a stage within the instruction pipeline to issue a corresponding data fetch.

6. The method of claim 5 and further comprising:
issuing a fetch request in response to the data fetching instruction reaching a stage within the instruction pipeline to issue the corresponding data fetch;
receiving fetched data in response to the fetch request;
comparing the fetched data to the first data quantity; and
responsive to determining that the fetched data matches the first data quantity, the step of graduating the speculatively executed data fetching instruction.

7. The method of claim 5 and further comprising:
issuing a fetch request in response to the data fetching instruction reaching a stage within the instruction pipeline to issue the corresponding data fetch;
receiving fetched data in response to the fetch request;
comparing the fetched data to the first data quantity; and
responsive to determining that the fetched data does not match the first data quantity, the steps of:
  re-completing the execution stage in connection with the data fetching instruction using the fetched data; and
after the re-completing step, graduating the data fetching instruction.

8. The method of claim 1 and further comprising the steps of:
storing within each entry in the on-chip storage resource an accuracy measure representative of the likelihood that the data fetching instruction should complete the execution stage using the corresponding first data quantity;
issuing a fetch request in response to receiving the data fetching instruction reaching a stage within the instruction pipeline to issue the corresponding data fetch;
receiving fetched data in response to the fetch request;
wherein the group of data quantities further comprises the fetched data; and
wherein the step of completing the execution stage in connection with the data fetching instruction using a predetermined data quantity comprises
  selecting the first data quantity corresponding to the instruction memory address where the further instruction is stored from the group of data quantities and speculatively completing the execution stage in connection with the data fetching instruction in response to detecting that the prefetched data quantity has not returned in response to the prefetch request at a time when the data fetching instruction reaches a stage within the instruction pipeline to issue a corresponding data fetch and further in response to determining that the accuracy measure is above a predetermined threshold;
  selecting the fetched data when received from the group of data quantities and completing the execution stage in connection with the data fetching instruction in response to determining that the accuracy measure is below the predetermined threshold.

9. The method of claim 1 and further comprising the steps of:
   storing a subset of data in an on-chip data cache;
   determining if a prefetch request generates a data cache hit indicating that data to be fetched resides within the on-chip data cache; and
   said sixth step of completing the execution stage of a data fetching instruction selects the prefetched data quantity in response to detecting a prefetch request data cache hit.

10. A microprocessor, comprising:
    an instruction pipeline comprising a preliminary stage, a plurality of stages following the preliminary stage, and an execution stage following the plurality of stages;
    circuitry for receiving an instruction into the preliminary stage of the instruction pipeline from an instruction memory at a first time;
    circuitry for determining if a received instruction is a data fetching instruction;
    circuitry for fetching a first data quantity for the data fetching instruction to complete the execution stage of the pipeline in response to determining the received instruction is a data fetching instruction;
    circuitry for completing the execution stage in connection with the data fetching instruction using the first data quantity; and
    an on-chip storage resource storing at least one entry including a first data quantity and an address within the instruction memory where a corresponding data fetching instruction is stored;
    circuitry for storing the first data quantity and the address of the corresponding data fetching instruction in the on-chip storage resource;
    circuitry for determining that a received instruction is a data fetching instruction if the instruction memory address of the received instruction equals an address of an entry in said on-chip storage resource;
    circuitry, responsive to determining the received instruction is a data fetching instruction, for issuing a prefetch request for a prefetched data quantity for the data fetching instruction to complete the execution stage of the pipeline; and
    circuitry, responsive to determining the received instruction is a data fetching instruction, for completing the execution stage in connection with the data fetching instruction using a predetermined data quantity, wherein the predetermined data quantity is selected from a group of quantities comprising the first data quantity in the on-chip resource corresponding to the instruction memory address where the received instruction is stored and the prefetched data quantity.

11. The microprocessor of claim 10:
    wherein the on-chip storage resource comprises a prefetch buffer; and
    further comprising circuitry for copying the first data quantity from the load target buffer entry to the prefetch buffer.

12. The microprocessor of claim 10:
    wherein the on-chip resource comprises a prefetch buffer; and further comprising:
    circuitry for receiving the prefetched data quantity in response to the circuitry for issuing a prefetch request; and
    circuitry for overwriting the first data quantity in the prefetch buffer entry with the prefetched data quantity.

13. The microprocessor of claim 12 wherein the circuitry for completing the execution stage in connection with the data fetching instruction using a predetermined data quantity comprises circuitry for selecting the prefetched data quantity from the prefetch buffer.

14. The microprocessor of claim 10 wherein:
    said completing circuitry selects the first data quantity from the group of data quantities for speculatively completing the execution stage in response to detection circuitry detecting that the prefetched data quantity has not returned in response to the prefetch request at a time when the data fetching instruction reaches a stage within the instruction pipeline to issue a corresponding data fetch.

15. The microprocessor of claim 14 and further comprising:
    circuitry for issuing a fetch request in response to the data fetching instruction reaching a stage within said instruction pipeline to issue the corresponding data fetch;
    circuitry for receiving fetched data in response to the fetch request;
    circuitry for comparing the fetched data to the first data quantity;
    circuitry for determining whether the fetched data matches the first data quantity; and
    circuitry, responsive to said circuitry for determining that the fetched data matches the first data quantity, for graduating the speculatively completed data fetching instruction.

16. The microprocessor of claim 14 and further comprising:
    circuitry for issuing a fetch request in response to the data fetching instruction reaching a stage within said instruction pipeline to issue the corresponding data fetch;
    circuitry for receiving fetched data in response to the fetch request;
    circuitry for comparing the fetched data to the first data quantity;
    circuitry for determining whether the fetched data matches the first data quantity; and
    circuitry, responsive to determining that the fetched data does not match the first data quantity, for re-completing the execution stage in connection with the data fetching instruction using the fetched data and thereafter graduating the data fetching instruction.

17. The microprocessor of claim 16 and further comprising:
    circuitry for storing within each entry in the on-chip storage resource an accuracy measure representative of the likelihood that the data fetching instruction should complete the execution stage using the corresponding first data quantity;
    circuitry for issuing a fetch request in response to the data fetching instruction reaching a stage within the instruction pipeline to issue the corresponding data fetch;
    circuitry for receiving fetched data in response to the fetch request;
    circuitry for determining whether the accuracy measure is below a predetermined threshold;
    wherein the group of data quantities further comprises the fetched data; and
    wherein the circuitry for completing the execution stage in connection with the data fetching instruction using a predetermined data quantity comprises circuitry for speculatively completing the execution stage in connection with the data fetching instruction by selecting the first data quantity in response to detecting that the prefetched data quantity has not returned in response to the prefetch request at a time when the data fetching instruction reaches a stage within the instruction pipeline to issue a corresponding data fetch and further in response to determining that the accuracy measure is above said predetermined threshold;

circuitry for completing the execution stage in connection with the data fetching instruction using the fetched data in response to the circuitry for deter mining that the accuracy measure is below said predetermined threshold.

18. The microprocessor of claim 10 and further comprising:

an on-chip data cache storing a subset of data;

circuitry determining if a prefetch request generates a data cache hit indicating that data to be fetched resides within the on-chip data cache; and said circuitry for completing the execution stage of a data fetching instruction selects the prefetched data quantity in response to detecting a prefetch request data cache hit.

* * * * *